Jan. 31, 1939. P. H. STAMBAUGH 2,145,614
HEATING AND INSULATING MEANS FOR TANK CARS
Original Filed Aug. 17, 1936 2 Sheets-Sheet 1
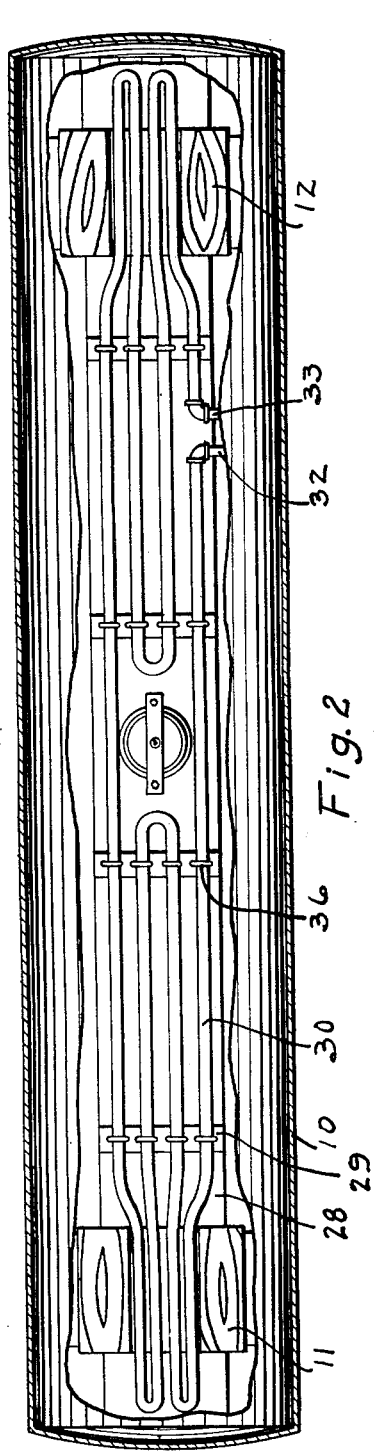
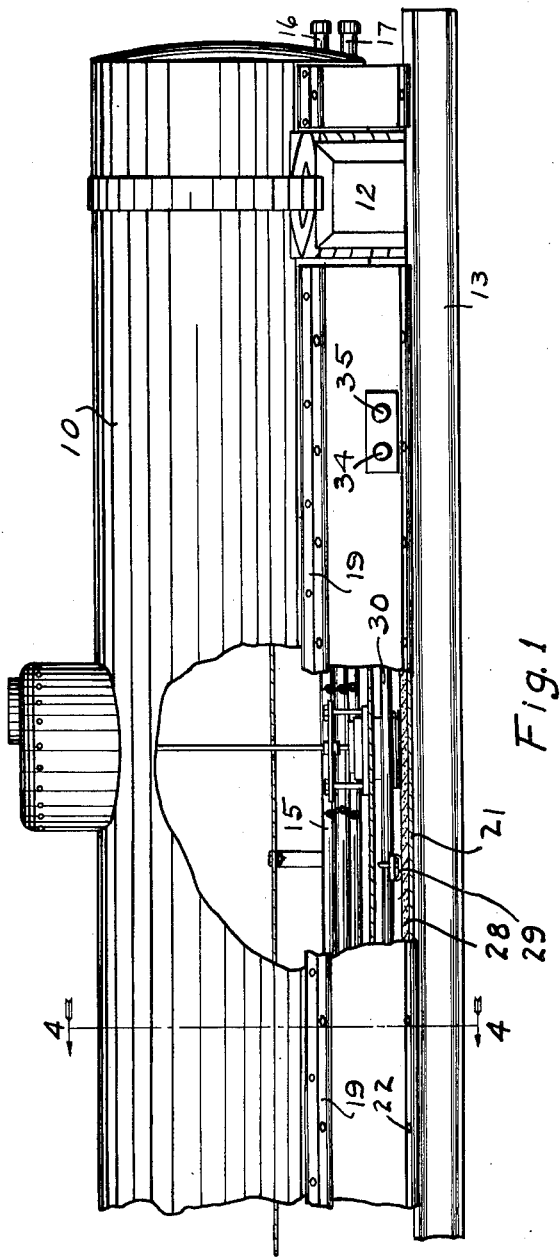
INVENTOR
Paul H. Stambaugh,
BY
ATTORNEYS Jan. 31, 1939.  P. H. STAMBAUGH  2,145,614
HEATING AND INSULATING MEANS FOR TANK CARS
Original Filed Aug. 17, 1936  2 Sheets-Sheet 2
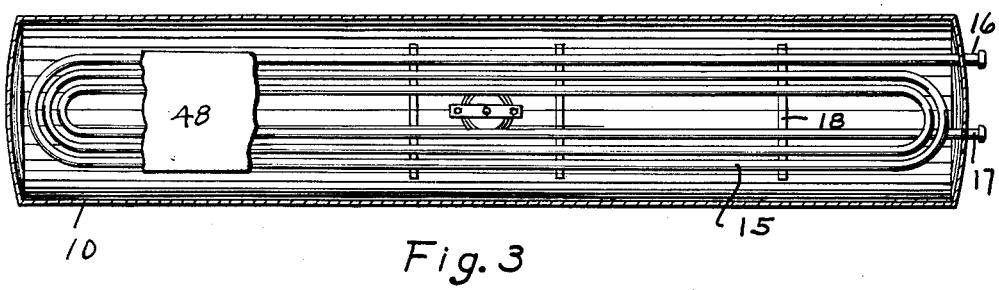
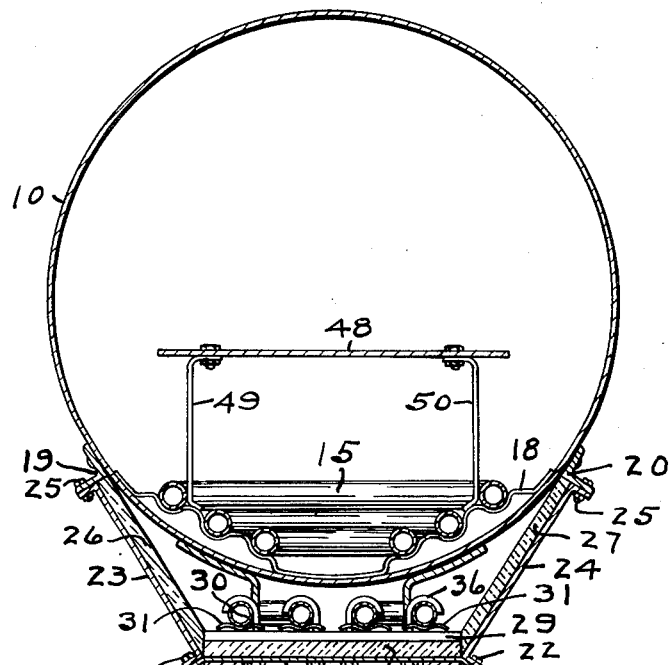
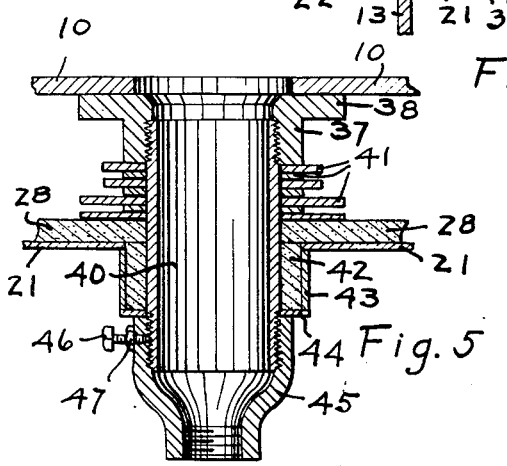
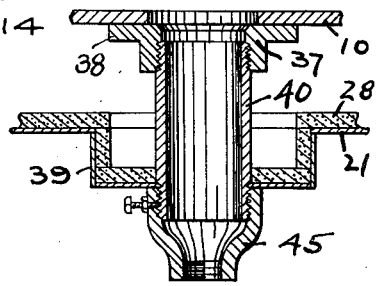
INVENTOR
Paul H. Stambaugh,
BY Minturn & Minturn
ATTORNEYS Patented Jan. 31, 1939

2,145,614

UNITED STATES PATENT OFFICE 2,145,614

HEATING AND INSULATING MEANS FOR TANK CARS

Paul H. Stambaugh, Columbus, Ind., assignor to Union Starch and Refining Company, Columbus, Ind.

Refiled for abandoned application Serial No. 96,419, August 17, 1936. This application May 12, 1937, Serial No. 142,185

3 Claims. (Cl. 257—198)

This application is a refile application substituted for abandoned application #96,419 filed Aug. 17, 1936.

This invention relates to tank cars and particularly to tank cars to be employed in the transportation of corn syrup. The invention has to do particularly with means for insulating and heating in such manner that the tanks may be readily and completely unloaded in cool or extremely cold conditions without danger of overheating and the resultant deterioration of the syrup.

In order that the invention may be better understood, some of the problems encountered in the transportation of corn syrup will be pointed out. In the first place the syrup referred to will usually have a normal flowing temperature range between 80 and 115 degrees F. with an optimum temperature of around 105 degrees F. If the temperature is allowed to become excessive the syrup will become darkened and therefore have less value for some uses.

Heretofore tank cars have been provided with a heating coil positioned along the bottom of the tank internally thereof so that when the tank reached its destination, steam could be supplied to this internal coil in order to supply sufficient heat to the syrup in the tank as to reduce its viscosity sufficiently to bring it within the flowing range. Since the tank car is subjected to the atmospheric temperatures and often rain and snow in transit and when it is being unloaded, the syrup in some cases during cool weather and particularly during the winter months will arrive at its destination in a plastic condition. When steam is turned into the internal heating coil, the syrup immediately surrounding the coil will become heated and thereby tend to rise within the tank against the colder syrup thereabove. It has generally occurred that during the initial period the heat is dissipated from the locally heated syrup adjacent the coils into the colder syrup so slowly as to, in fact, produce little effect on the large mass of syrup thereabove in the tank with the result that the syrup immediately around the coil becomes heated to a rather high degree frequently sufficiently high as to discolor it. The fact that the entire circumferential area of the tank car is exposed to the atmospheric temperature, and often to rain and snow increases the probability of damaging the syrup adjacent to the coils during the initial heating period. What actually happens during that intermediate period is that due to convection currents rising upwardly rather freely directly above the heating coil and then downwardly more slowly on the sides, the syrup that has been heated flows along the external wall of the tank and is chilled and this chilled syrup tends to flow around the inside wall toward the floor of the tank, the outside temperature being such that before flowing very far, the syrup again reaches the congealed state. The result is that the syrup is in many cases overheated actually around the coil and also directly above the coils at the top of the tank without heating the mass of syrup sufficiently to cause it to flow out freely at the outlet. In short, the syrup on the bottom of the tank below the coil, in such instances never became sufficiently heated to flow freely to the outlet.

When the weather conditions are not so severe and yet when the viscosity of the syrup is such that the syrup does not flow readily, steam applied to the inside tank coil will of course reduce the viscosity sufficiently to permit a rapid unloading. However, the syrup may burn on the coils and in some cases when drawn below the coil, the burned syrup that adheres to the coils drops off in chunks with iron scale adhering. Therefore the problem presents itself of not only providing satisfactory means for adequately reducing the viscosity of the syrup in the cold winter months but also to provide for reducing the viscosity to some degree in other months without damaging the syrup and without leaving considerable unheated syrup on the floor of the tank.

My invention provides an additional outside heating coil and insulating means around the lower portion of the tank to control the application of heat to the tank and prevent dissipation of heat from the lower portion into the atmosphere. A further feature of the invention is that the insulating means together with the outside coil permits the application of heat to the syrup in sufficient amounts to reduce the viscosity without damaging the syrup and this is an extremely important matter.

Considering again, the tank as heretofore built with the internal heating coil only, placing internal baffles inside the tank above the coil in an attempt to control and direct the convection currents in the syrup to obtain a flow at the tank outlet only aggravated the situation that prevails during the initial heating period by holding the heated syrup in proximity to the internal coil. The upper portion must be left bare to dissipate the heat from the syrup not only after initially loading the tank but also to prevent overheating at the top of the tank when unloading.

By adding the under outside heating coil as contemplated by my invention, a baffle or baffles may be placed in the tank since it is the syrup on the bottom of the tank that is initially heated by that outside coil. The baffling may be arranged in any suitable manner to control the convection currents.

While the invention may be embodied in many different forms, one particular form which is quite effective is herein more or less diagrammatically shown and described as a good working example.

This form of the invention is illustrated by the accompanying drawings, in which Fig. 1 is a fragmentary side elevation of a tank car embodying my invention;

Fig. 2, a longitudinal transverse section through the tank with the under side of the tank removed to disclose the outside coil;

Fig. 3, a longitudinal transverse section through the tank showing the internal heating coil;

Fig. 4, a transverse vertical section on the line 4—4 in Fig. 1 on an enlarged scale;

Fig. 5, a detail in vertical section through the tank outlet, and

Fig. 6, a similar section of a simplified outlet.

Like characters of reference indicate like parts throughout the several views in the drawings.

A tank 10 of the usual and well known metal construction is mounted in the customary manner on bolsters 11 and 12 in turn supported by the sills 13 and 14. Within the tank 10 is carried in the lower portion thereof, a customary heating coil 15, herein shown as of a continuous circuit having an inlet end 16 and a discharge end 17, the coil being supported above the floor of the tank 10 in any suitable manner at sufficient distance to make floor accessible for cleaning, here shown as on a number of cradles 18.

Externally of the tank, on each side thereof is positioned respectively angles 19 and 20 extending the full length of the tank. The angles are symmetrically positioned in respect to the horizontal center line and are positioned on the tank wall at an elevation below the tank center. It is essential that these angles 19 and 20 be secured to the wall of the tank in such manner that water will not run down between the tank wall and the contacting legs of the angles. Rain and melting snow ordinarily would run down the tank wall to the extreme under side, but by use of these angles, the water is deflected from the tank wall on both sides, and the under side of the tank remains dry, and therefore is not subjected to that cooling action of the water and melted snow. In the mounting herein shown, the angles are positioned to have an upturned leg contacting the tank wall so as to leave the other leg turned outwardly from the under side of the angle. Across the sills 13 and 14 is positioned a length of steel plate 21. This steel plate has sufficient width to extend outwardly beyond the sills a sufficient distance to form flanges through which bolts 22 may be passed on through like flanges of side enclosing members 23 and 24 respectively which slope upwardly and outwardly to have outturned flanges abutting the under sides of the outturned legs of the angles 19 and 20 where bolts 25 pass through these legs and flanges to secure those members in position. A lining of insulating material is provided, herein shown as in the form of an insulating board 26 lying against the inner side of the member 23 and an insulating board 27 lying against the inner side of the member 24. These boards are maintained in fixed position by any suitable attaching means on the members 23 and 24 respectively. The lower ends of these boards abut the sides of a horizontally disposed insulating board 28 which rests on and is secured to the steel plate 21.

At intervals along the insulating board 28, are placed transverse plates 29. A heating coil generally designated by the numeral 30 is positioned under the tank to be supported by these transverse plates 29. In order to give a greater radiating surface, corrugated metal strips 31, preferably perforated, may be placed across these plates 29 longitudinally under each pipe length forming the coil 30. Each strip 31 consists essentially of a width of corrugated iron, in an upper groove of which the pipe length rests, the outer legs of the corrugated strip bearing downwardly against the transverse plates 29. It is to be noted that in this form of mounting, space is left under the heating coil, and under the contacting strips 31 so that convection currents may flow about the coil to aid in carrying heat therefrom upwardly to the tank 10 above. It is to be noted further that the coil 30 is not in direct contact with the tank 10 but is spaced a slight distance therebelow.

In the form herein shown, the external heating coil 30 has the intake nipple 32 and the outlet nipple 33 which project through the side member 23 and its insulating member 26 for applying steam to the coil 30. The coil 30 is anchored in position by J bolts 36 which pass downwardly through the respective plates 29, insulating member 28 and the steel plate member 21.

The tank has a standard outlet, Fig. 6, consisting of the fitting 37 attached to the under side of the tank 10 by the flange 38. A nipple 40 extends downwardly from the fitting 37 and carries a reducing coupling 45 on its lower end. The coupling 45 is screw-threaded to receive any suitable fitting (not shown) into which syrup from the tank is to be drained. An insulated box 39 is dropped from the plate 21 to surround the nipple 40 so as to subject most of its length to the heat coming from the outside coil 30.

As shown in Fig. 5, radiating fins in the nature of washers 41 of different diameters may be placed around the nipple 40 as indicated with insulating 42 and a protecting collar 43 surrounding the insulation, all supported by resting on a washer 44 bearing against the coupling 45, secured in position by the customary coupling held securely in position by the set screw 46 and lock washer 47.

Assuming the tank car filled with corn syrup having arrived at its destination in extremely cold weather, and steam to be supplied to circulate through the coil 15 only, the general result is, that as the corn syrup is heated during the initial period too much heat is concentrated adjacent the coil. Furthermore, during that intermediate period convection currents in the syrup will cause the warm syrup to flow upwardly in the center portion of the tank and to have that warmed syrup strike the wall of the tank with the result that the cooled syrup will tend to flow downwardly from the upper portion of the tank around on each inner side wall down under the heating coil to the extreme lower under side of the tank. That would be the normal tendency but of course it becomes apparent at once that the syrup becomes greatly chilled in flowing downwardly in contact with the wall of the tank which is exposed to atmosphere and winds, and often to rain and snow, tending further to remove the heat. In this event, this cold syrup becomes more viscous and of course the heating then has had no effect, insofar as that syrup is concerned to permit flow to the outlet. It frequently occurs where steam is used in the coil 15, only, regardless of the amount of steam forced through, the syrup can not be heated to such an extent, without danger to it, as will cause warm syrup or syrup of sufficiently low viscosity to flow out the outlet. In short, the syrup on the floor of the tank can not with safety, by the internal coil only, be heated and maintained at a sufficient temperature to allow it to flow out the outlet.

To avoid such conditions, steam should be first applied to the external coil 30. The heat from the coil 30 confined within the chamber formed by the insulating members above described, will sufficiently heat the under side of the tank 10 as to heat this cold syrup on the floor of the tank under the coil 15.

Since the outside coil is not in contact with the syrup, there is no danger of causing damage thereby to the syrup. When this lowest portion of the syrup is heated by the outside coil 30 the syrup can flow. If additional heating is required steam is then admitted to the inside coil 15, and now, since the syrup below is already sufficiently heated to flow to the outlet, the syrup above heated by the inside coil 15 can flow in downward current to the outlet with the syrup on the floor heated by outside coil 30. Thus the syrup may move readily to the outlet away from the coil 15.

It is to be observed that by reason of the coil 30 being in the confined chamber with the tank floor forming the upper side thereof, with low external temperature, the heat is not dissipated by winds, rain or snow, but can only be transmitted through the tank floor so that very efficient use is made of the steam applied to the coil 30.

As above indicated baffling may be used within the tank 10 so as to control the convection currents within the syrup to induce a greater flow of syrup downwardly around the inner side of the tank adjacent the floor. This baffling may take a number of forms, one of which may take the form of a flat perforated plate 48, Fig. 4, herein shown as being mounted by legs 49 and 50 extending above the coil supports 18 and 19. By use of such a baffle, the convection currents tending to rise vertically above the coil 15 are retarded so that the flow will be principally downward to the outlet and laterally from the under side of the baffle plate 48 toward the sides of the tank. Sufficient heat would be supplied to the mass of syrup above the plate 48 as to permit it to flow. This baffling is feasible on account of the initial heating of the syrup on the tank bottom by the external coil 30 so that the bottom syrup may flow and thereby permit the syrup to flow in downward current, away from the coil 15 without overheating.

In milder weather, steam should be used only in the external coil 30 so as to remove all possibility of damaging the syrup. By employing the external coil only in mild weather, the syrup can be quickly brought to within its flowing range so that the tank car may be quickly unloaded.

Since the outlet extends from the floor of the tank 10 downwardly through the chamber formed by the insulating walls under the tank, this outlet is subjected to the heated air therewithin and consequently would normally not require the use of a steam coil therearound or a steam jacketed leg as has heretofore been used to prevent congealing of the syrup as it left the tank. The heating of the outlet may be further facilitated by the use of the radiating fins formed by the plates 41 which conduct the heat to the internal wall of the outlet and thereby keep the outlet wall heated to a degree which will impart heat to the syrup flowing therethrough rather than subtract heat therefrom. Therefore, syrup flowing through the outlet will have sufficient heat stored in it so as to permit the syrup to flow on through a hose or pipe line into a building without becoming congealed and having its viscosity increased to a point retarding free flow. It is to be noted that in the particular structure of the outlet as shown and described in reference to Fig. 5 in the drawings, the disassembly is readily made in case it is necessary to repair the outlet and all parts may be removed and replaced at will.

While I have herein shown and described my invention in a one best form as now known to me, it is obvious that structural changes may be employed without departing from the spirit of the invention and I, therefore, do not desire to be limited to that precise form beyond the limitations as may be imposed by the following claims.

I claim:

1. In combination with a tank adapted to hold a material at times requiring heat to reduce its viscosity to a flowing range having heating means internally and substantially throughout the length of the tank, of heating means externally and under substantially the entire length of said tank for heating said material on the tank bottom independently of said internal heating means and reheating said material which tends to cool on contact with the tank wall and bottom as it flows downwardly therealong in a convection current, whereby the material may reach the bottom of the tank in a sufficiently heated condition as to flow readily; a heat insulated wall surrounding said external heating means and the lower part of said tank thus forming a heating chamber with the under side of the tank as the top side of said chamber and extending upwardly a substantial distance on the sides of the tank; and an outlet leg extending through said chamber to be heated therefrom.

2. In combination with a tank having internal heating means adjacent the tank bottom and adapted to hold a material at times requiring heat to reduce its viscosity to a flowing condition, of baffling means internally of the tank for reducing upward convection current flow in said material, and additional heating means located externally and under substantially the entire length of said tank for heating the material on the tank bottom and reheating said material which tends to cool on contact with the tank wall and floor as it flows downwardly therealong in said current flow, whereby the material may be at the bottom of the tank in a sufficiently heated condition as to flow readily, said two heating means being arranged for selective independent operation.

3. In combination with a tank adapted to hold material at times requiring heat to reduce its viscosity to a flowing range, heating means internally and substantially throughout the length of the tank near the floor thereof, heating means externally and under substantially the entire length of said tank for heating said material on the tank bottom independently of said internal heating means, a heat insulating wall surrounding said external means and the lower part of said tank to form a heating chamber with the under side of the tank as the top side of said chamber and extending upwardly a substantial distance on the sides of the tank, said external heating means comprising a coil of pipes through which a heating medium may be circulated selectively independently of circulation through said internal heating means.

PAUL H. STAMBAUGH.